United States Patent [19]

Beeftink et al.

[11] 4,191,990

[45] Mar. 4, 1980

[54] ARRANGEMENT FOR ADJUSTING HEADLIGHTS

[75] Inventors: Maarten C. Beeftink, Heerlen, Netherlands; Manfred Helgers, Geilenkirchen-Lindern, Fed. Rep. of Germany

[73] Assignee: U.S. Philips Corporation, New York, N.Y.

[21] Appl. No.: 824,522

[22] Filed: Aug. 15, 1977

[30] Foreign Application Priority Data

Aug. 20, 1976 [DE] Fed. Rep. of Germany ....... 2637485

[51] Int. Cl.² .............................................. F21V 11/00
[52] U.S. Cl. ...................................... 362/276; 362/20; 362/64
[58] Field of Search ...................... 362/64, 276, 20, 83

[56] References Cited

U.S. PATENT DOCUMENTS

2,719,217  9/1955  Lemons .............................. 362/64 X

Primary Examiner—Stephen J. Lechert, Jr.
Attorney, Agent, or Firm—Thomas A. Briody; Bernard Franzblau

[57] ABSTRACT

Arrangement for adjusting headlights wherein the lightbeam of the headlight to be adjusted is incident through a convergent lens onto a frosted glass screen, characterized in that the output of a television camera for picking-up the brightness picture on the frosted glass screen is connected through a non-linear amplifier to the input of a monitor.

8 Claims, 3 Drawing Figures

ARRANGEMENT FOR ADJUSTING HEADLIGHTS

The invention relates to an arrangement for adjusting headlights wherein the lightbeam of the headlight to be adjusted is incident through a convergent lens on a frosted glass screen.

Such an arrangement is known from German Pat. No. 1,005,464. It is an object of such a device to provide an optimum illumination of the road by a proper adjustment of the headlight, and also to prevent dazzling of an approaching driver to a very high degree. The criteria required for such an adjustment are fixed by regulations. FIG. 1 shows, for example, the brightness distribution for a headlight adjusted for right-hand traffic in order to satisfy the given requirements. Above a line H–H' the brightness must be reduced to an extent such that no dazzling can occur. This corresponds with the Isolux curve 0.7 Lux (A) above which the brightness must not exceed this value. The point E 75 must have a minimum brightness of 6 lux and must be located within the isolux curve (B) for 6 lux.

As is known the bright-dark limits of such headlights are, however, very unsharp and it is often very difficult to obtain an accurate adjustment. An additional drawback is that the adjustment is predominantly done on the basis of subjective criteria as only the eyes and experience of the adjuster are decisive. These drawbacks also apply to the arrangement of German Pat. No. 1,005,464 mentioned before.

It is an object of the present invention to provide an improvement in the arrangement of the type mentioned such that the adjustments can be done to objective criteria.

In accordance with the invention the arrangement is characterized in that the output of a television camera for picking-up the brightness picture on the frosted glass screen is connected through a non-linear amplifier to the input of a monitor.

The characteristic of the non-linear amplifier can be formed such that it comprises various properly adjustable thresholds.

It is also advantageous to provide the screen of the monitor with an overlay which corresponds with the prescribed brightness distribution with which the light beam originating from the headlight can be brought into agreement.

The invention will now be described in greater detail with reference to the accompanying drawing in which.

Figure 2:
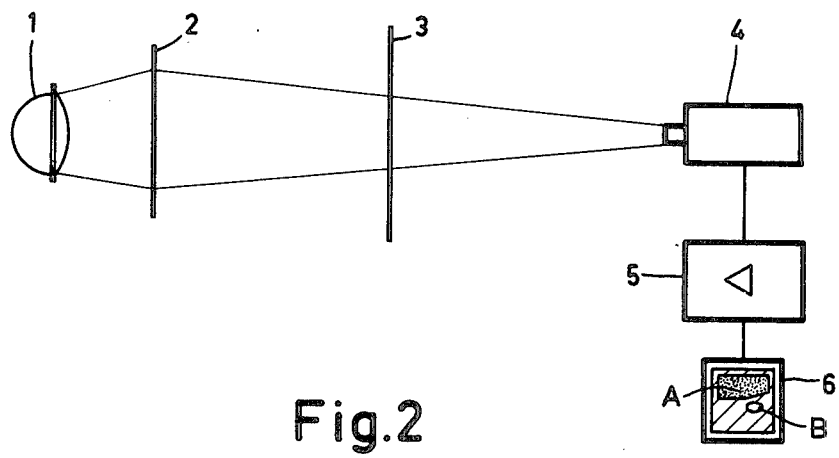
FIG. 2 illustrates the embodiment of the invention.

The invention will be described in greater details with reference to an embodiment thereof shown in FIG. 2.

Figure 1:
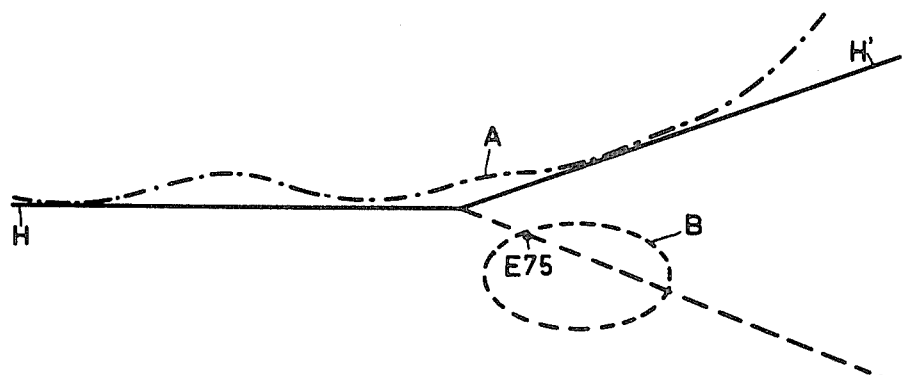
FIG. 1 shows the brightness distribution pattern for a headlight.
Figure 3:
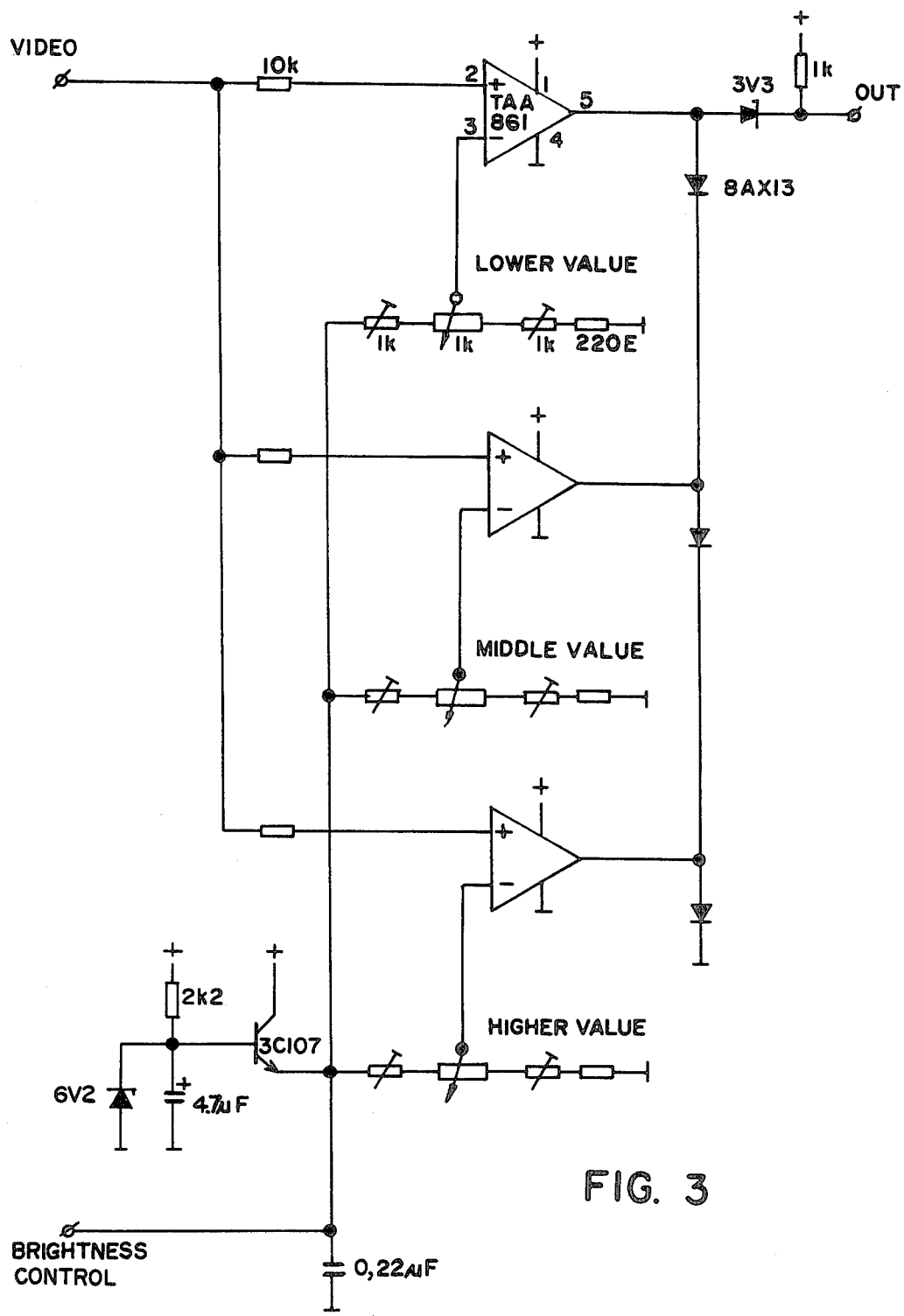
FIG. 3 shows the details of the non-linear amplifier of FIG. 2.

The light beam originating from a headlight 1 to be adjusted is incident through a convergent lens 2 on a frosted glass screen 3. A television camera 4 scans in known manner the brightness picture of the headlight 1 depicted on the frosted glass screen 3. The output voltage of the television camera 4 is passed on to a non-linear amplifier 5 whose output voltage is supplied to a monitor 6. The output voltage of the television camera is proportional to the brightness of the scanned dots of the frosted glass screen 3. In order to produce one or more sharp bright-dark limits on the screen of the monitor 6, the amplifier 5 is constructed as a non-linear amplifier. That is to say, within given brightness values and, consequently, output voltage values of the television camera 4, the output of the amplifier 5 supplies a very definite brightness. In the examples shown the range (A) above the line H–H' in FIG. 1 consequently remains dark, the range within the isolux curve 6 (B) remains white and the remaining portion remains grey. The non-linear amplifier 5 (see FIG. 3) comprises three differential amplifiers conventional in the art each having a different voltage threshold value applied to its inverting input. The non-inverting (+) inputs are connected together through individual resistors and the outputs are connected together through diodes, one diode being connected to ground.

Consequently all brightness values which the television camera 4 records are converted into only three brightness values on the monitor 6. It is of course possible to adapt the number of brightness values in accordance with the requirements by a corresponding choice of thresholds in the amplifier 5. It is also possible to adapt the arrangement by shifting the threshold values to lamps of a different power.

By means of the proposed arrangement it is therefore possible to effect an objective adjustment which is fully independent of the subjective criteria of the adjusters. It is also possible by means of the invention to reject lamps and/or headlights with which the requirements imposed cannot be achieved. A layover can be applied onto the screen of the monitor 6 which corresponds to the prescribed brightness distribution with which the lightbeam, originating from headlight 1 must be brought into agreement.

What is claimed is:

1. An arrangement for monitoring the brightness distribution of the light beam produced by a headlight comprising a convergent lens for passing the lightbeam onto a frosted glass screen, a television camera arranged to pick-up the brightness picture on the frosted glass screen, a non-linear amplifier, and means connecting the output of the television camera through said non-linear amplifier to the input of a monitor.

2. An arrangement as claimed in claim 1, wherein the non linear amplifier has several threshold values.

3. An arrangement as claimed in claim 1 wherein a layover element having the required brightness distribution pattern is disposed on a screen of the monitor.

4. An arrangement as claimed in claim 2 further comprising means for adjusting the threshold values of the non-linear amplifier.

5. An arrangement as claimed in claim 1, wherein the non-linear amplifier comprises at least three differential amplifiers having their non-inverting inputs coupled together to an input terminal of the amplifier and their inverting inputs individually coupled to terminals at which different levels of voltage threshold values appear, and means coupling the outputs of the differential amplifiers to an output terminal of the amplifier.

6. An arrangement as claimed in claim 5, wherein the non-linear amplifier further comprises means for individually adjusting the amplitude levels of the threshold voltages appearing at said terminals.

7. An arrangement as claimed in claim 5, wherein said output coupling means includes a plurality of diodes individually coupling the outputs of the differential amplifiers to said amplifier output terminal.

8. An apparatus for monitoring the brightness distribution pattern of a headlight light beam comprising, a screen for receiving the brightness distribution pattern of the headlight light beam, a lens arranged to focus the light beam onto said screen, a television camera arranged to scan the light pattern on the screen and produce corresponding output electric signals, a monitor device, a non-linear amplifier having at least two different voltage threshold levels whereby the different light brightness values of the light pattern on the screen may be converted into either of two signal values in accordance with said voltage threshold levels, and means coupling the output of the television camera to the input of the monitor device via said non-linear amplifier.

* * * * *